(12) United States Patent
Swarup et al.

(10) Patent No.: US 8,242,211 B2
(45) Date of Patent: Aug. 14, 2012

(54) METHOD FOR PRODUCING A DISPERSION COMPRISING A TWO STAGE REACTION PRODUCT AND AN ASSOCIATED COATING

(75) Inventors: Shanti Swarup, Allison Park, PA (US); Thi Bach-Phuong Dau, Stuttgart (DE); Helena Recio, Ingersheim (DE)

(73) Assignee: PPG Industries Ohio, Inc, Cleveland, OH (US)

(*) Notice: Subject to any disclaimer, the term of this patent is extended or adjusted under 35 U.S.C. 154(b) by 353 days.

(21) Appl. No.: 12/693,792

(22) Filed: Jan. 26, 2010

(65) Prior Publication Data
US 2010/0190911 A1    Jul. 29, 2010

Related U.S. Application Data

(60) Provisional application No. 61/147,581, filed on Jan. 27, 2009.

(51) Int. Cl.
*C08L 33/02* (2006.01)
*C08L 33/08* (2006.01)
*C08L 33/10* (2006.01)

(52) U.S. Cl. ........ 525/221; 525/418; 525/451; 524/502; 524/556; 524/606

(58) Field of Classification Search ................ 525/221, 525/418, 451; 524/556, 502
See application file for complete search history.

(56) References Cited

U.S. PATENT DOCUMENTS

| | | | | |
|---|---|---|---|---|
| 5,068,288 | A | * | 11/1991 | Taljan et al. ............... 525/155 |
| 5,539,022 | A | * | 7/1996 | Schmidt et al. ............ 523/402 |
| 6,048,936 | A | * | 4/2000 | Epple et al. ................ 525/124 |
| 6,881,786 | B2 | | 4/2005 | Swarup et al. |
| 6,884,845 | B2 | | 4/2005 | Swarup et al. |

* cited by examiner

*Primary Examiner* — Satya Sastri

(57) ABSTRACT

The present invention is directed to a method for producing a dispersion comprising: (a) forming a first reaction product by reacting: (a1) at least one monomer comprising an ethylenically unsaturated double bond; (a2) at least one carboxylic acid group-containing monomer; and (a3) at least one glycidyl ester compound; wherein the molar ratio of (a2) to (a3) is substantially 1:1; (b) forming a second reaction product in the presence of the first reaction product by reacting: (b1) at least one monomer comprising an ethylenically unsaturated double bond; and (b2) at least one carboxylic acid group-containing monomer; and (c) reacting an amine compound with the second reaction product; and wherein steps (a), (b), and (c) are conducted in a substantially solvent free environment.

18 Claims, No Drawings

METHOD FOR PRODUCING A DISPERSION COMPRISING A TWO STAGE REACTION PRODUCT AND AN ASSOCIATED COATING

CROSS REFERENCE TO RELATED APPLICATIONS

This application claims benefit of U.S. Provisional Application No. 61/147,581 filed Jan. 27, 2009.

BACKGROUND OF THE INVENTION

1. Field of the Invention

The present invention relates to a method of producing a dispersion as well as to a coating comprising the dispersion.

2. Background Information

Over the past several years, there has been an effort to reduce atmospheric pollution caused by volatile solvents that are emitted during a painting process. However, it is often difficult to achieve high quality, smooth coating finishes, such as are required in the automotive industry, without using organic solvents which contribute greatly to flow and leveling of a coating. Therefore, one of the goals of the coatings industry is to minimize the use of organic solvents by formulating waterborne coating compositions which provide a smooth, high gloss appearance, as well as good physical properties including resistance to acid rain.

SUMMARY OF THE INVENTION

The present invention is directed to a method for producing a dispersion comprising: (a) forming a first reaction product by reacting: (a1) at least one monomer comprising an ethylenically unsaturated double bond; (a2) at least one carboxylic acid group-containing monomer; and (a3) at least one glycidyl ester compound; wherein the molar ratio of (a2) to (a3) is substantially 1:1; (b) forming a second reaction product in the presence of the first reaction product by reacting: (b1) at least one monomer comprising an ethylenically unsaturated double bond; and (b2) at least one carboxylic acid group-containing monomer; and (c) reacting an amine compound with the second reaction product; and wherein steps (a), (b), and (c) are conducted in a substantially solvent free environment. The present invention is also directed to a coating composition comprising the dispersion.

The present invention is also directed to a method for producing an aqueous dispersion consisting essentially of: (a) forming a first reaction product by reacting: (a1) at least one monomer comprising an ethylenically unsaturated double bond; (a2) at least one carboxylic acid group-containing monomer; and (a3) at least one glycidyl ester compound; wherein the molar ratio of (a2) to (a3) is substantially 1:1; (b) forming a second reaction product in the presence of the first reaction product by reacting: (b1) at least one monomer comprising an ethylenically unsaturated double bond; and (b2) at least one carboxylic acid group-containing monomer; (c) reacting an amine compound with the second reaction product; and (d) adding water to the reaction product of step (c); wherein steps (a), (b), and (c) are conducted in a substantially solvent free environment. The present invention is also directed to a coating composition comprising the dispersion.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "a" monomer comprising an ethylenically unsaturated double bond, "a" carboxylic acid group-containing monomer, "a" glycidyl ester compound, a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

As used herein, the term "cure" refers to a coating wherein any crosslinkable components of the composition are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will comprise the residues of the monomer components.

Method for Producing a Dispersion

The present invention is directed to a method for producing a dispersion, such as an aqueous dispersion, which comprises a two stage reaction product. In certain embodiments, the two stage reaction product is a two stage polymer. A two stage reaction product is formed by forming a first reaction product then forming a second reaction product in the presence of the first reaction product. Each of the steps in the method is performed in a substantially solvent free environment. As used herein, a "substantially solvent free environment" means that trace or incidental amounts of organic solvent, such as $\leq 5$ weight % or $\leq 3$ weight % or $\leq 1$ weight % based on all of the ingredients used in the reaction mixture, can be present.

The method begins by (a) forming a first reaction product by reacting: (a1)) at least one monomer comprising an ethylenically unsaturated double bond; (a2) at least one carboxylic acid group-containing monomer, and (a3) at least one glycidyl ester compound. The molar ratio of (a2) to (a3) in this step is substantially 1:1.

Any suitable monomer comprising an ethylenically unsaturated double bond may be used as component (a1), so long as it may be polymerized under the conditions described herein. Suitable monomers that may be used include, without limitation, (meth)acrylate, vinyl aromatic compounds (e.g. styrene, vinyl toluene), nitriles (e.g., (meth)acrylonitrile), vinyl and/or vinylidene halides (e.g., vinyl chloride, vinylidene fluoride), vinyl esters (e.g., vinyl acetate), allyl (e.g., allyl alcohol, allyl acid), or combinations thereof.

Suitable (meth)acrylate monomers include, without limitation, the $C_1$-$C_{30}$ aliphatic alkyl esters of (meth)acrylic acid such as methyl(meth)acrylate, ethyl(meth)acrylate, propyl(meth)acrylate, N-butyl(meth)acrylate, t-butyl(meth)acrylate, 2-ethylhexyl(meth)acrylate, isobornyl(meth)acrylate, glycidyl(meth)acrylate, dimethylaminoethyl(meth)acrylate, N-butoxy methyl(meth)acrylamide, lauryl(meth)acrylate, cyclohexyl(meth)acrylate, 3,3,5-trimethylcyclohexyl(meth)acrylate, hydroxy functional (meth)acrylates (e.g., hydroxyethyl(meth)acrylate, hydroxy butyl(meth)acrylate, hydroxy propyl(meth)acrylate), or combinations thereof.

Any suitable carboxylic acid group-containing monomer may be used as component (a2), so long as it may be polymerized under the conditions described herein. Suitable monomers that may be used include, without limitation, (meth)acrylic acid, maleic acid and its corresponding anhydride, itaconic acid, aconitic acid, fumaric acid, alpha-halo acrylic acid, vinyl acetic acid, beta-carboxymethyl (meth)acrylate, or combinations thereof.

Suitable monomers that may be used as component (a3) include, without limitation, the glycidyl esters of carboxylic acids such as VERSATIC ACID 911 and CARDURA E, each of which is commercially available from Resolution Performance Products.

The reaction product that is formed in step (a) does not comprise acid functionality. Additionally, depending on the monomers used in step (a), the reaction product that is formed during this step may or may not comprise a reactive functional group. As used herein, the phrase "reactive functional group" means hydroxyl, carbamate, epoxy, isocyanate, aceto acetate, amine, mercaptan, or combinations thereof.

Step (b) comprises forming a second reaction product in the presence of the first reaction product by reacting: (b1) at least one monomer comprising an ethylenically unsaturated double bond; and (b2) at least one carboxylic acid group-containing monomer. Any amount of (b2) can be used in step (b) so long as the amount would be sufficient to disperse the reaction product in water after neutralization by an acid (see step (c) below). In certain embodiments, (b2) comprises ≦50 weight % of the total resin solids of (b1) and (b2). For example, in some embodiments, (b2) comprises 10 weight % to 20 weight % of the total resin solids of (b1) and (b2). It should be noted that the ingredients (b1) and/or (b2) may be the same or different from the ingredients used in (a1) and/or (a2), respectively. For example, in certain embodiments, hydroxy(meth)acrylate may be used for both (a1) and (b1). In other embodiments, however, hydroxy(meth)acrylate may be used for (a1) while butyl acrylate may be used as (b1).

Unlike the reaction product that is formed in step (a), the reaction product that is formed in step (b) comprises acid functionality (e.g., carboxylic acid functionality). Additionally, depending on the monomers used in step (b), the reaction product that is formed during this step may comprise a reactive functional group in addition to the carboxylic acid functional group described in the preceding sentence.

A free radical polymerization initiator is typically used in step (a) and/or (b). Suitable compounds that may be used as the free radical polymerization initiator include, without limitation, thermal initiators, photoinitiators, oxidation-reduction initiators, or combinations thereof. Examples of thermal initiators include, without limitation, azo compounds, peroxides, persulfates, or combinations thereof. Suitable persulfates include, without limitation, sodium persulfate, ammonium persulfate, or combinations thereof. Oxidation-reduction initiators include, without limitation, persulfate-bisulfite systems, systems utilizing thermal initiators in combination with appropriate metal ions such as iron or copper, or combinations thereof.

Suitable azo compounds include, but are not limited to non-water-soluble azo compounds such as 1-1'-azobiscyclohexanecarbonitrile, 2-2'-azobisisobutyronitrile, 2-2'-azobis(2-methylbutyronitrile), 2-2'-azobis(propionitrile), 2-2'-azobis(2,4-dimethylvaleronitrile), 2-2'-azobis(valeronitrile), 2-(carbamoylazo)-isobutyronitrile and mixtures thereof; and water-soluble azo compounds such as azobis tertiary alkyl compounds including, but not limited to, 4-4'-azobis(4-cyanovaleric acid), 2-2'-azobis(2-methylpropionamidine)dihydrochloride, 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N,N'-dimethyleneisobutyramidine)dihydrochloride, or combinations thereof.

In certain embodiments, step (a) and/or (b) is conducted via polymerization techniques known in the art. For example, in some embodiments, step (a) and/or (b) is conducted at a temperature ≧100° C., such as 160° C., to drive the polymerization process. In other embodiments, step (a) and/or (b) is conducted at a temperature ≦200° C. In some embodiments, the temperature can range between any combination of values, which were recited in the preceding sentences, inclusive of the recited values. For example, in certain embodiments, the temperature can range from 150° C. to 170° C. or from 160° C. to 180° C. In some embodiments, the temperature used to form a polymer in step (b) may be the same or different from the temperature used to form a polymer in step (a). For example, in certain embodiments, the temperature used to form the polymers in steps (a) and (b) can be 160° C. In other embodiments, however, the temperature used to form the polymer in step (a) could be 160° C. while the temperature that is used to form the polymer in step (b) could be 180° C.

In certain embodiments, the weight ratio of the reaction product of step (a) to the reaction product of step (b) can range from 3:1 to 4:1. In some embodiments, the dispersion has a viscosity ≦1000 centipoises (cps), such as from 400 cps to 600 cps. In certain embodiments, the % solids of the dispersion is ≧40%, such as from 40% to 50% or from 43% to 46%.

Following step (b), the method calls for reacting an amine compound with the second reaction product (step (c)). In certain embodiments, step (c) is conducted at a temperature that is below the boiling point temperature of the amine compound. For example, in some embodiments, step (c) is conducted at a temperature of ≦120° C., such as ≦80° C. The amine compound that is typically added during this step is added in an amount sufficient to provide a pH of 7 to 10 when the reaction product of this step is dispersed in water. Suitable amines that may be used in this step include, without limitation, dimethylethanolamine, ammonia, triethyl amine, diethyl propanol amine, or combinations thereof.

In certain embodiments, the reaction product of step (c) is not further reacted with a polyester polyol. Therefore, in these embodiments, the reaction product does not comprise a polyester polyol residue.

The reaction product of step (c) can then be dispersed in an aqueous environment using techniques known in the art. For example, water can be introduced into the reaction vessel containing the reaction product of step (c) or the reaction product can be added into another reactor or container that contains water. In some embodiments, the water can contain other water dispersed components that can be added either prior to or after the reaction product of step (c) is dispersed in the water.

Coating Composition

The dispersion described above can be incorporated into a coating composition, such as a waterborne coating composition, which can be used in a variety of coating applications. Accordingly, in one embodiment, the present invention is directed to a coating composition comprising the dispersion prepared using the method described above. In certain embodiments, the coating composition can further comprise a crosslinking agent (curing agent). The crosslinking agent is reactive with a reactive functional group on the reaction product of step (c). Suitable crosslinking agents include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof.

In certain embodiments, the crosslinking agent comprises ≧10% by weight of the total resin solids of the coating composition. In other embodiments, the crosslinking agent comprises ≦45% by weight of the total resin solids of the coating composition. In certain embodiments, the total amount of crosslinking agent in the coating composition can range between any combination of values, which were recited in the preceding sentences, inclusive of the recited values. For example, in certain embodiments, the total amount of crosslinking agent can range from 25% by weight to 35% by weight, such as 28% by weight, of the total resin solids of the coating composition.

The coating composition described herein may further comprise additional ingredients such as colorants. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, or mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in United States Patent Application Publication 2005-0287348, filed Jun. 24, 2004, U.S. Provisional Application No. 60/482,167, filed Jun. 24, 2003, and U.S. patent application Ser. No. 11/337,062, filed Jan. 20, 2006.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, catalysts, including phosphonic acids and other customary auxiliaries.

Substrate with a Coating System

The coating composition described above may be applied alone or as part of a coating system that can be deposited onto a number of different substrates. The coating system typically comprises a number of coating layers. A coating layer is typically formed when a coating composition that is deposited onto the substrate is substantially cured by methods known in the art (e.g., by thermal heating). It is noted that the coating composition described above can be used in one or more of the coating layers described in the following paragraphs.

Suitable substrates that can be coated with the coating composition comprising the polymer include, without limitation, metal substrates, metal alloy substrates, substrates that have been metallized, such as nickel plated plastic, and/or plastic substrates. In some embodiments, the metal or metal alloy can be aluminum and/or steel. For example, the steel substrate could be cold rolled steel, electrogalvanized steel, and/or hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or not pretreated with a pretreatment solution.

In a conventional coating system used in the automotive industry, a pretreated substrate is coated with an electrodepositable coating composition. After the electrodepositable coating composition is cured, a primer-surfacer coating composition is applied onto a least a portion of the electrodepositable coating composition. The primer-surfacer coating composition is typically applied to the electrodepositable coating layer and cured prior to a subsequent coating composition being applied over the primer-surfacer coating composition. However, it should be noted that in some embodiments, the substrate is not coated with an electrodepositable coating composition. Accordingly, in these embodiments, the primer-surfacer coating composition is applied directly onto the substrate.

The primer-surfacer layer that results from the primer-surfacer coating composition serves to enhance chip resistance of subsequently applied coating layers (e.g., color imparting coating composition and/or substantially clear coating composition) as well as to aid in the appearance of the subsequently applied layers. As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482.

It should be noted that in some embodiments, the primer-surfacer coating composition is not used in the coating system. Therefore, a color imparting basecoat coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472 can be used in the coating system. In certain embodiments, the substantially clear coating composition can also comprise a particle, such as a silica particle, that is dispersed in the clearcoat coating composition (such as at the surface of the clearcoat coating composition after curing). In some embodiments, the coating composition comprising the polymer described herein can be used as the clearcoat coating composition.

One or more of the coating compositions described in the preceding paragraphs can comprise the colorants and the other optional materials (which are known in the art of formulated surface coatings) described above.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

In certain embodiments, the present invention may be used in a monocoat coating system. In a monocoat coating system, a single coating layer is applied over a substrate (which can be pretreated or non-pretreated) that can comprise one or more of the following layers (as described above): an electrodepositable coating layer or a primer-surfacer coating layer.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, one or more of the uncured coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures ≧10° C. In other embodiments, the curing operation can be carried out at temperature ≦246° C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be ≦125 microns, such as ≦80 microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Examples

Example 1

This example demonstrates the synthesis of the stable aqueous dispersion of a carboxylic acid containing acrylic polymer polyol of the present invention. The synthesis uses the ingredients shown in Table 1.

TABLE 1

| Ingredient | Amount |
| --- | --- |
| Charge 1 | |
| Glycidyl ester of branched decanoic acid[1] | 877.2 |
| Charge 2 | |
| di-t-amyl peroxide | 17.2 |
| Glycidyl ester of branched decanoic acid[1] | 98.1 |
| Dipropylene glycol monoether (rinse) | 40.0 |
| Charge 3 | |
| Butyl acrylate | 748.2 |
| Styrene | 904.5 |
| Hydroxyethyl methacrylate | 397.3 |
| Methoxy polyethyleneglycol methacrylate, | 44.4 |
| Acrylic acid | 309.6 |
| Dipropylene glycol monoether (rinse) | 40.0 |
| Charge 4 | |
| Butyl acrylate | 108.4 |
| Styrene | 180.6 |
| Hydroxyethyl methacrylate | 180.6 |
| Acrylic acid | 95.5 |
| Dipropylene glycol monoether (rinse) | 40.0 |
| Charge 5 | |
| di-t-amyl peroxide | 10.3 |
| Dipropylene glycol monoether (rinse) | 40.0 |
| Charge 6 | |
| Dimethyl ethanol amine | 125.4 |
| Charge 7 | |
| Deionized water | 4500.0 |

[1]Cardura ™ Resin E-10, Resolution Performance Products, Houston, TX

Charge 1 was added to a reaction vessel equipped with a reflux condenser and nitrogen blanket and heated to 160° C. Charge 2 and Charge 3 were added simultaneously over 4.5 and 4.0 hours respectively. Upon the completion of the charge 2 the reaction product was held for 45 minutes. Charge 4 and Charge 5 were then added simultaneously over 30 and 40 minutes, after which time the resulting product continued to be mixed in the vessel at 160° C. The product was cooled to 120° C. and charge 6 was added over a 30 minute period of time. Charge 7 was pre-heated to 70° C. and added to the vessel over a 30 minute period. The product was mixed for one hour at 70-80° C. and decanted. The resulting product had total solids of about 45 weight percent (1-hour at 110° C.), pH of 8.4 and viscosity of 750 cps (Brookfield, RVT spindle #1, 30 rpm at 22.3° C.).

Coating Examples (1K)

Coating 1: A waterbased monocoat was prepared from the following ingredients:

| INGREDIENTS | AMOUNTS (grams) |
|---|---|
| Component I | |
| Polymer of Example 1 | 45.0 |
| Component II | |
| Methylated melamine resin[1] | 10.0 |
| Silicone oil[2] | 0.2 |
| Tinuvin 123[3] | 0.6 |
| Tinuvin 1130[3] | 0.4 |
| Aliphatic Solvent[4] | 1.0 |
| Glycol ether[5] | 3.0 |
| Polyester resin[6] | 3.3 |
| Component III | |
| Tint paste 1 | 2.0 |
| Tint paste 2 | 25.0 |
| Tint paste 3 | 3.2 |
| Tint paste 4 | 1.3 |
| Component IV | |
| Deionized water | 5.0 |

[1]Melamine crosslinker, available from Cytec Industries or Ineos Melamines GmbH
[2]Additives, available from Byk Chemie
[3]Additives, available from Ciba
[4]Solvents, available from Shell
[5]Solvents, available from Condea
[6]Resin QP-69-6150, available from Cytec Waterbased monocoat compositions were prepared from the components indicated in coating example 1 K. Charge II was mixed separately under agitation for 1 hour at room temperature. Charge II was added into charge I under agitation for 15 min and kept stirring for additional 1 hour. Charge III was mixed separately under agitation for 15 min. Charge III was added into charge I and II under agitation for 15 min. The dispersion was allowed to sit overnight. Charge IV was added slowly under agitation to bring the dispersion to the spraying viscosity 60 seconds efflux cup DIN 4 at 23° C.

Application:

Each of the waterborne monocoat examples was sprayed by hand with a Sata gun (1.3 mm nozzle) in an environment controlled to 21.1° C. and 60% relative humidity. The coating was applied over commercial primer available from PPG Industries, Inc. The monocoat was then applied in two coats without any flash. The topcoated panels were allowed to flash for five to ten minutes at ambient condition and baked for 10 minutes at 60° C. and finally, for 30 minutes at 145° C.-150° C. Panels were baked in a horizontal position. The film build was approximately 2.0 mils.

Analysis

Each of the coating examples was evaluated after baking for physical properties. An entire 4 inch by 12 inch panel was examined in each case.

The results of evaluation of the coated panels baked at 145° C. for gloss, indentation hardness, delamination, adhesion and acid resistance are summarized in Table below.

| | Test Method | | 1K WB Monocoat control[1] | Coating 1 |
|---|---|---|---|---|
| Gloss 20° | ISO 2813 | | 87 | 90 |
| Hardness | ISO 2815 | | 100 | 120 |
| Surface appearance (lower values are better) | Byk wavescan | Long wave | 20 | 15 |
| | | Short wave | 60 | 30 |

[1]Available from PPG Industries, Inc.

What is claimed is:

1. A method for producing a dispersion comprising:
 (a) forming a first reaction product by reacting:
  (a1) at least one monomer comprising an ethylenically unsaturated double bond;
  (a2) at least one carboxylic acid group-containing monomer; and (a3) at least one glycidyl ester compound; wherein the molar ratio of (a2) to (a3) is substantially 1:1;
 (b) forming a second reaction product in the presence of the first reaction product by reacting:
  (b1) at least one monomer comprising an ethylenically unsaturated double bond;
  and (b2) at least one carboxylic acid group-containing monomer; and
 (c) reacting an amine compound with the second reaction product;
 wherein steps (a), (b), and (c) are conducted in a substantially solvent free environment.

2. The method according to claim 1, further comprising (d) adding water to the reaction product of step (c).

3. The method according to claim 2, wherein (c) is conducted at a temperature ≦120° C.

4. The method according to claim 1, wherein step (a) is conducted at a temperature ≧140° C.

5. The method according to claim 1, wherein step (b) is conducted at a temperature ≧140° C.

6. The method according to claim 1, wherein the second reaction product is not further reacted with a polyester polyol.

7. The method according to claim 1, wherein (a1) and (b1) comprises butyl (meth)acrylate, styrene, hydroxyethyl methacrylate, or combinations thereof, and wherein (a1) may be the same or different from (b1).

8. The method according to claim 1, wherein (a2) and (b2) comprises acrylic acid.

9. The method according to claim 1, wherein (a3) comprises the glycidyl ester of an aliphatic saturated monocarboxylic acid.

10. The method according to claim 1, wherein the amine compound comprises dimethyl ethanol amine.

11. The method according to claim 1, wherein the weight ratio of the first reaction product to the second reaction product ranges from 3:1 to 4:1.

12. A method for producing an aqueous dispersion consisting essentially of:
 (a) forming a first reaction product by reacting:
  (a1) at least one monomer comprising an ethylenically unsaturated double bond;
  (a2) at least one carboxylic acid group-containing monomer; and (a3) at least one glycidyl ester compound; wherein the molar ratio of (a2) to (a3) is substantially 1:1;
 (b) forming a second reaction product in the presence of the first reaction product by reacting:

(b1) at least one monomer comprising an ethylenically unsaturated double bond;
and (b2) at least one carboxylic acid group-containing monomer;
(c) reacting an amine compound with the second reaction product; and
(d) adding water to the reaction product of step (c);
wherein steps (a), (b), and (c) are conducted in a substantially solvent free environment; and wherein step (a), (b), or (a) and (b) comprises a free radical polymerization initiator.

13. The method according to claim 12, wherein the second reaction product is not further reacted with a polyester polyol.

14. The method according to claim 12, wherein (a1) and (b1) comprises butyl (meth)acrylate, styrene, hydroxyethyl methacrylate, or combinations thereof, and wherein (a1) may be the same or different from (b1).

15. The method according to claim 12, wherein (a2) and (b2) comprises acrylic acid.

16. The method according to claim 12, wherein (a3) comprises the glycidyl ester of an aliphatic saturated monocarboxylic acid.

17. The method according to claim 12, wherein the amine compound comprises dimethyl ethanol amine.

18. The method according to claim 12, wherein the weight ratio of the first reaction product to the second reaction product ranges from 3:1 to 4:1.

* * * * *